United States Patent
Roys et al.

(10) Patent No.: US 6,709,723 B2
(45) Date of Patent: Mar. 23, 2004

(54) THICK SHEET LAMINATION PRODUCT FOR USE IN EXTERIOR AUTOMOTIVE BODY PANELS

(75) Inventors: John E. Roys, Lowell, IN (US); Howard H. Enlow, Munster, IN (US); Paul J. Martus, North Branch, MI (US)

(73) Assignee: Avery Dennison Corporation, Pasadena, CA (US)

( * ) Notice: Subject to any disclaimer, the term of this patent is extended or adjusted under 35 U.S.C. 154(b) by 33 days.

(21) Appl. No.: 09/945,000

(22) Filed: Aug. 31, 2001

(65) Prior Publication Data

US 2002/0050665 A1 May 2, 2002

Related U.S. Application Data

(62) Division of application No. 09/093,471, filed on Jun. 8, 1998, now Pat. No. 6,284,183.

(51) Int. Cl.⁷ .............................................. B60B 13/00
(52) U.S. Cl. ..................... 428/31; 428/46; 428/187; 428/174; 428/213; 428/323; 428/908.8
(58) Field of Search ................ 428/46, 31, 187, 428/208, 174, 908.8, 213, 323

(56) References Cited

U.S. PATENT DOCUMENTS

| | | | |
|---|---|---|---|
| 4,515,649 A | * | 5/1985 | Nussbaum |
| 4,931,324 A | * | 6/1990 | Ellison et al. |
| 5,203,941 A | * | 4/1993 | Spain et al. |
| 5,306,548 A | | 4/1994 | Zabrocki et al. |
| 5,342,666 A | * | 8/1994 | Ellison et al. |
| 5,441,816 A | | 8/1995 | Grohman |
| 5,599,608 A | | 2/1997 | Yamamoto et al. |
| 5,707,697 A | | 1/1998 | Spain et al. |
| 5,759,477 A | | 6/1998 | Yamamoto |
| 5,919,537 A | | 7/1999 | Niazy |
| 5,985,079 A | * | 11/1999 | Ellison |

FOREIGN PATENT DOCUMENTS

| | | |
|---|---|---|
| DE | 29 38 462 A1 | 3/1980 |
| DE | 42 28 194 A1 | 3/1994 |
| GB | 1 225 438 | 8/1969 |
| WO | 89/06598 | 7/1989 |
| WO | 90/06857 | 12/1990 |
| WO | 94/03337 | 2/1994 |
| WO | 96/40480 | 12/1996 |
| WO | 96/40519 | 12/1996 |

* cited by examiner

Primary Examiner—Merrick Dixon
(74) Attorney, Agent, or Firm—Christie, Parker & Hale, LLP

(57) ABSTRACT

An exterior automotive quality paint coat is laminated to the surface of a plastic car body member of panel. A dry paint transfer film is first laminated to a relatively thin semi-rigid thermoformable resinous backing sheet. The backing sheet side of the resulting laminate is then laminated to a relatively thick thermoformable substrate sheet comprising the same or a compatible polymeric material. The two sheets are joined by extruding the thick substrate sheet and using the heat of extrusion to then laminate the thin backing sheet to the thicker extruded substrate sheet. The resulting thick sheet laminate is then thermoformed, preferably by first heating the laminate to a forming temperature, followed by vacuum forming the laminate to a three-dimensional shape of the finished automotive part, such as a facia, ready to put on a vehicle.

9 Claims, 4 Drawing Sheets

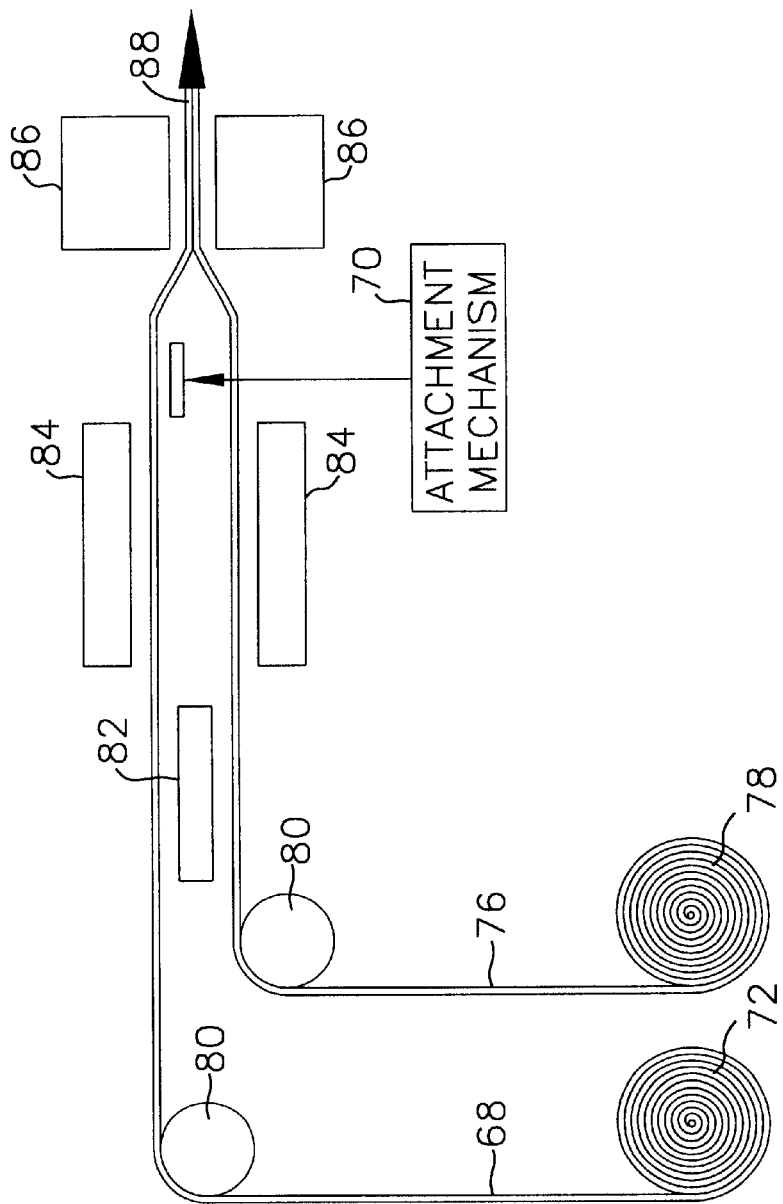

THICK SHEET LAMINATION PRODUCT FOR USE IN EXTERIOR AUTOMOTIVE BODY PANELS

CROSS-REFERENCE TO RELATED APPLICATIONS

This is a division of U.S. patent application Ser. No. 09/093,471, filed Jun. 8, 1998, now U.S. Pat. No. 6,284,183.

FIELD OF THE INVENTION

This invention relates to the manufacture of exterior automotive body panels or members made from polymeric materials, and more particularly, to a dry paint transfer-lamination process for applying preformed paint film laminates to plastic substrate sheet materials. The process avoids the separate step of injection molding a substrate panel to the dry paint transfer laminate.

BACKGROUND OF THE INVENTION

Exterior automotive body panels have been made in the past by spray painting sheet metal parts. Multi-layer paint coats, such as those referred to as clear coat/color coat paint systems, have been used to produce desirable optical effects. In addition to high gloss and high distinctness-of-image (DOI), these paint coats also are highly durable by providing chemical resistance, abrasion resistance and weatherability that avoids degradation by ultraviolet light.

In more recent years, molded plastic car body panels have been made with decorative clear coat/color coat paint films bonded to the molded plastic panel. Use of such films avoids certain environmental problems associated with evaporation of paint solvents while also reducing or eliminating the need for paint facilities and emission controls at the automotive production plant.

Because of the growing need to reduce atmospheric pollution caused by solvents emitted during the painting process, many different approaches have been taken in recent years for producing these decorative films. These processes can be generally categorized by solution-casting techniques or extrusion techniques. For instance, U.S. Pat. No. 5,707,697 to Spain et al. describes solution-casting techniques in which liquid-cast solvent-based clear coats and pigmented base coats are applied to a flexible casting sheet by a coating process such as reverse roll coating. The liquid-cast layers are separately applied and then dried at high temperatures to evaporate the solvents. Following the steps of casting the clear coat and color coat, the composite paint coat is removed from the carrier and transfer laminated to a thin, semi-rigid, thermoformable polymeric backing sheet. The preferred backing sheet is about 20 mils in thickness, although the backing sheet can have a thickness from about 10 mils to about 40 mils. The paint coated backing sheet is then thermoformed into a desired three-dimensional shape, followed by molding the substrate panel to the thermoformed sheet in an injection mold. This process, known as the "insert-mold" process, together with the transfer-lamination and thermoforming steps, are described in the above-mentioned '697 patent which is incorporated herein by this reference.

As an alternative to solvent-cast films, extruded films have been used for making exterior automotive clear coat/color coat paint films. International Application WO 96/40480 to Enlow et al., which is incorporated herein by this reference, describes an approach in which paint films and/or laminates are made by extrusion coating or coextrusion techniques. The paint film is transferred to a supportive backing sheet by transfer-lamination techniques, followed by thermoforming the paint coated backing sheet into a desired three-dimensional shape and injection cladding it to a substrate panel by the insert-mold process.

As a further alternative, a dry paint transfer sheet can be placed directly in an injection mold without thermoforming it outside the mold. The sheet in this instance is formed into a contoured shape under heat and pressure in the injection mold by the molding material in what is referred to as the "in-mold" process. Such a process, for example, is described in U.S. Pat. No. 4,810,540 to Ellison et al.

The present invention is based on a recognition that production costs for making these exterior automotive parts can be reduced by eliminating the injection-molding step. In other words, it can be desirable to manufacture an exterior automotive body member or panel so that the finished automotive part, such as a facia, is ready to put on the vehicle after the thermoforming step. This would require producing a polymeric substrate sheet with sufficient thickness and structural integrity to function as the finished part that adequately supports the transferred paint film. This also requires a polymeric substrate material that can be shaped by thermoforming techniques while not interfering with the desired optical properties (such as high distinctness-of-image and gloss) of the finished paint film. For instance, may be desirable to use polymeric substrate materials that contain high filler or regrind components in order to reduce the cost of the overall product. But these particulate materials can be transmitted from the substrate to the paint film during thermoforming, creating imperfections that degrade the otherwise desired smooth, high quality optical surface of the finished film. In addition, the thicker substrate sheet material can absorb substantial amounts of heat when bonding a paint film to it or when thermoforming it. Such excessive heat absorption can be transferred to the paint film surface and degrade the optical properties of the paint film by causing excessive haze or fogging of the clear coat. This problem is particularly critical when such exterior paint films are made from fluoropolymer resins, such as polyvinylidene fluoride (PVDF) and acrylic resin alloys of the types described in the above-mentioned '697 patent to Spain et al., International Application WO 96-40480 to Enlow et al., or the '540 patent to Ellison et al.

SUMMARY OF THE INVENTION

Briefly, one embodiment of this invention provides a process for making exterior automotive quality body members or panels from a preformed dry paint transfer laminate comprising an exterior automotive quality paint film applied to a relatively thin, semi-rigid, thermoformable polymeric backing sheet. The process includes the step of extruding a relatively thick sheet of a thermoformable polymeric material and forming a paint coated thick sheet laminate by laminating the backing sheet side of the preformed dry paint laminate to the extruded sheet. The lamination step is carried out using the heat of extrusion to heat bond the backing sheet and extruded sheet together to form an integral substrate sheet which is thermoformable to a three-dimensional shape with the dry paint film bonded to its exterior surface. The backing sheet and extruded sheet comprise compatible polymeric materials to promote the bond between them. In one embodiment the extruded sheet has a thickness of at least twice the thickness of the backing sheet. In another embodiment the backing sheet has a thickness from about 10 mils to about 30 mils, and the extruded substrate sheet has a thickness of at least about 40 mils. In forming the thick sheet laminate to a desired shape, heat is initially applied to the laminate to gradually raise the substrate temperature to the forming temperature. This step is followed by forming the laminate to a three-dimensional shape, preferably by vacuum forming, to produce a finished exterior automotive quality body panel or member.

The present invention provides a process for manufacturing a high quality exterior automotive paint finish (high gloss and high DOI) on a body member of panel of a thickness up to about 0.250 inch, by first laminating the dry paint transfer film to the relatively thin polymeric backing sheet, and subsequently laminating the backing sheet to the substantially thicker extruded substrate sheet. The intermediate backing sheet provides a barrier that prevents transmission of defects from filler and regrind materials contained in the substrate sheet material to the paint film surface, thereby preserving the high quality optical properties of the finished film during thermoforming to a finished three-dimensional shape.

A primary advantage of the process is the elimination of a subsequent injection molding step. This greatly reduces production costs because the high cost of an injection molding tool is avoided. Processing time also is reduced.

As mentioned, the paint film-backing sheet laminate is heat-bonded to the extruded substrate sheet, using the heat of extrusion to bond the backing sheet to the extruded substrate. This lowers production costs by reducing the overall number of steps in the process, when compared with laminating the backing sheet to a preformed substrate sheet or molded sheet.

In one form of the invention, the extruded substrate sheet is rapidly cooled following extrusion and prior to lamination to the dry paint transfer laminate. This avoids high levels of heat being transmitted to the paint film which could otherwise be at a level sufficient to cause haze or other degradation of the optical properties of the paint film. Haze is undesirable not only in the clear coat (because it lowers gloss and DOI) but also in the color coat, because it can produce undesired color changes causing difficulties in color matching. Further, preferred thermoforming techniques include preheating the extruded substrate sheet under controlled heating conditions prior to thermoforming. This can reduce the amount of heat to which the paint film is exposed during thermoforming to further control excessive heat transmission to the paint film.

These and other aspects of the invention will be more fully understood by referring to the following detailed description and the accompanying drawings.

BRIEF DESCRIPTION OF THE DRAWINGS

FIG. 8 is a schematic side elevational view showing a process for twin sheet forming a reinforced finished part.

DETAILED DESCRIPTION

Figure 1:
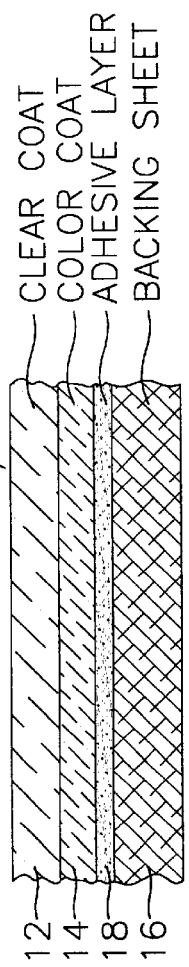
FIG. 1 is a schematic cross-sectional view illustrating one embodiment of a preformed laminate comprising an exterior automotive quality dry paint transfer film adhered to a thin, semi-rigid polymeric backing sheet.

An exterior automotive quality paint film is applied to a polymeric substrate sheet by a combination of steps which include forming a dry paint transfer film of exterior automotive quality, transferring the dry paint film to a thin supporting backing sheet, laminating the resulting preformed dry paint film laminate to an extruded thick substrate sheet, and thermoforming the resulting paint coated laminate to the shape of a finished part. FIG. 1 illustrates one embodiment of the invention in which the initial dry paint transfer laminate 10 comprises an exterior automotive base coat/clear coat paint film which includes an outer clear coat 12 and an underlying pigmented color coat 14. The clear coat/color coat paint film can comprise any exterior automotive dry paint transfer film which is weatherable, durable, thermoformable, and has thermoplastic properties in the sense that the paint film can be subjected to elongation under application of heat in a thermoforming process to shape the film to a finished three-dimensional contour while retaining exterior automotive durability and optical properties required for exterior automotive use. In one preferred form of the invention, the clear coat layer is preferably a dry paint film having a thickness of about 0.5 to about 1.5 mils. For metallic paint films, the clear coat can have a thickness up to about 2 mils. The clear coat preferably comprises a blend of a thermoplastic fluorinated polymer and an acrylic resin. The preferred clear coat preferably contains a thermoplastic fluorocarbon such as polyvinylidene fluoride (PVDF). The fluorinated polymer can comprise a homopolymer or copolymers and terpolymers of vinylidene fluoride. The acrylic resin component of the clear coat can be a polymethyl methacrylate or a polyethyl methacrylate resin or mixtures thereof. A preferred formulation comprises from about 50% to about 70% PVDF and from about 30% to about 50% acrylic resin, based on the total resin solids in the paint film. Formulations suitable for preparing clear coat paint films useful in practicing this invention are described in more detail in U.S. Pat. No. 5,707,697 to Spain et al. which is incorporated herein by reference.

The Spain, et al. '697 patent discloses solvent-casting techniques that can be used for making the base coat/clear coat paint film. According to that process, the clear coat and color coat are cast in sequence on a polyester carrier sheet and dried to evaporate the solvents. The clear coat is cast on a high gloss, smooth polyester casting film in order to transfer high quality optical properties to the clear coat surface.

The color coat 14 is cast on the clear coat after the clear coat has been dried on the carrier sheet. The color coat can be coated on the dried clear coat, or the color coat can be coated on a separate polyester casting film, dried, and later transferred from the casting film to the clear coat. In either case, the color coat is preferably applied to the casting film by reverse roll coating, comma coating, or die coating techniques similar to those used in forming the solvent-cast clear film. The color coat preferably comprises a thermoplastic synthetic resinous coating composition containing a level of pigment and/or metallic flakes to provide the necessary appearance for exterior automotive use of the finished part. The color coat contains a sufficient amount of pigment to maintain sufficient opacity and distinctness-of-image while avoiding stress whitening throughout the thermoforming step so as to function as an exterior automotive paint coat. The pigmented base coat may contain a sufficient amount of reflective flakes to provide metallic base coat/clear coat paint films and their resulting desirable optical properties, if desired. The preferred dry film thickness of the color coat is about 0.5 to about 1.5 mils. In a preferred form of the invention, the color coat comprises a blended thermoplastic fluorinated polymer and acrylic resin paint system similar to the paint system used in forming the clear coat. As with the clear coat, suitable color coat formulations also are described in the previously referenced Spain et al. '697 patent.

As an alternative to the base coat/clear coat paint film of FIG. 1, the exterior automotive paint film may include a combination exterior clear coat and a tint coat, or the paint coat may comprise a single dry thin film coating of a pigmented synthetic resinous material having desired exterior automotive properties. Alternatively, the base coat/clear coat paint film may be produced by extrusion coating techniques such as those described in International Application WO 96/40480 to Enlow et al. which is incorporated herein by reference.

Whether the paint film is made from solvent casting techniques or extrusion coating techniques, in either instance the dry paint transfer film is laminated to a thermoformable backing sheet 16 with an intervening adhesive layer or size coat 18. The backing sheet is a semi-rigid, self-supporting, thin, flat sheet of a thermoformable polymeric material. The backing sheet is made from a material having a thickness capable of thermoforming into a complex three-dimensional shape while protecting the outer paint film from transmission of defects from an underlying substrate sheet 56 described below. The material from which the substrate sheet is made can contain a substantial amount of filler or regrind particles and therefore can produce imperfections in the surface of the finished article. The backing sheet has a thickness in the range from about 10 mils to about 30 mils. The preferred material from which the backing sheet is made is ABS, thermoplastic olefins (TPO), or other olefinic materials containing polypropylene or polyethylene. The thickness of the backing sheet is sufficient to absorb defects from the underlying substrate sheet to avoid transmission of defects to the surface of the paint film. The backing sheet material also is of substantially higher grade than the underlying substrate material. The higher quality backing sheet material has a substantially lower gel count than the substrate material. The substrate material also can contain filler and a regrind content up to about 30% of its total volume and/or weight. Such filler and regrind materials are essentially absent from the backing sheet material.

Figure 2:
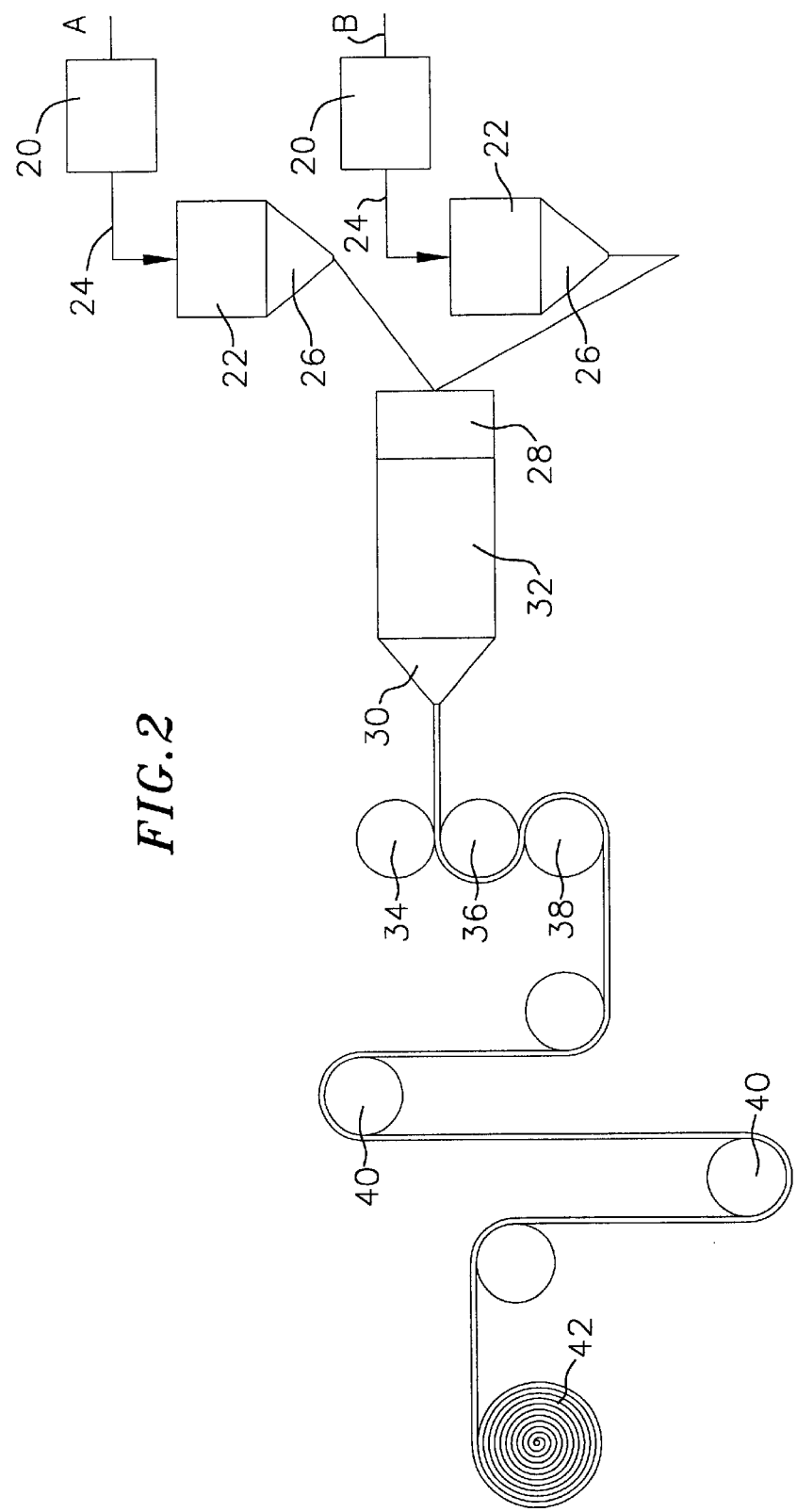
FIG. 2 is a schematic side elevational view showing a coextrusion process for making the backing sheet and adhesive layer component of the laminate shown in FIG. 1.

FIG. 2 illustrates one process for making a composite backing sheet and adhesive layer by coextrusion techniques. Alternatively, a single-layer preformed backing sheet can be adhered to an adhesive size coat which has been coated on the color coat side of the dry paint film. The size coat is bonded to the backing sheet in a transfer-lamination process such as that described in the above-referenced U.S. Pat. No. 5,707,697 to Spain et al. The size coat comprises any synthetic resinous material which is heat activated during the transfer-lamination step to bond the paint coat to the backing sheet. A preferred dry film thickness of the size coat is from about 0.1 to about 1.0 mil. The size coat is preferably applied as a thermoplastic paint coat and dried in the same multi-stage drying step used in drying the clear coat and color coat. For a PVDF—acrylic based paint system, an acrylic resin based size coat is preferred for suitable bonding of the paint coat to the backing sheet. In one embodiment, in which the paint coat is adhered to a backing sheet made of acrylonitrile-butydiene-styrene (ABS) this size coat can comprise a polymethyl-methacrylate resin dissolved in a suitable solvent and dried. In another embodiment, in which the backing sheet is a thermoplastic polyolefin, or is made from an olefinic material such as polypropylene, the size coat can comprise a composite of an acrylic resin layer for bonding to the color coat and a suitable chlorinated polyolefin bonding layer for bonding to the olefin-based backing sheet.

FIG. 2 illustrates a coextrusion process for making the backing sheet 16 and its adhesive layer 18. In one embodiment the coextrusion is made from starting materials comprising an acrylic resin A and an ABS resin B. Both resin materials are fed to separate driers 20 for removing excess moisture before extruding. Dried resin pellets of each material are fed from the drier into hoppers 22 via vacuum tubes 24. From the hoppers the pellets are gravity fed to separate extruders 26. The pellets are fed into the feed section of each extruder barrel. The resins in each extruder are heated to a molten state and fed through their respective barrel sections to a single combining block 28 and then into the die 30 of an extruder 32. The molten coextruded sheet exits the die and runs through a three-roll calendering (polishing) stack comprising an upper roller 34, an intermediate roller 36, and a bottom roller 38. The calendering operation polishes both sides of the coextruded sheet. The sheet then passes downstream away from the extruder and is cooled by passing over chill rolls 40 and is finally wound on an exit roll 42. In one embodiment, the final coextruded sheet comprises from about 0.8 to about 1.5 mils acrylic lacquer adhesive layer and a 28.5 mil ABS backing sheet layer. Other embodiments also are useful in practicing the invention as described in examples below.

Figure 3:
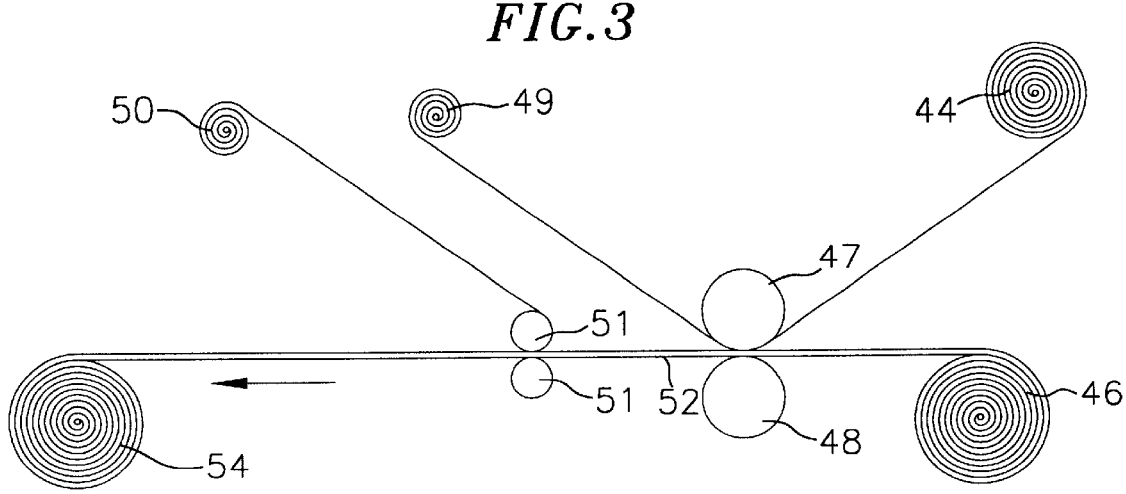
FIG. 3 is a schematic side elevational view showing a process for transfer-laminating a dry paint transfer film to a backing sheet.

FIG. 3 shows a transfer-lamination process for applying the dry paint transfer film to the backing sheet. In the process illustrated in FIG. 3 the backing sheet can either comprise a separate backing sheet with an adhesive size coat as described in U.S. Pat. No. 5,707,697 to Spain et al., or it can comprise the coextruded sheet described with reference to FIG. 2. Referring to FIG. 3 the laminating step includes the paint coated carrier stored on a top unwind roll 44 and a flexible adhesive coated backing sheet stored on a bottom unwind roll 46. The carrier and backing sheet pass between a heated laminating drum 47 and a rubber backup roll 48. The laminating drum is preferably made of steel and operated at a temperature of about 400° to 425° F. It is pressed into contact with the overlapping sheets to heat them to a temperature sufficient to activate the adhesive layer and press the two sheets into contact with each other to bond the paint coat to the backing sheet. The rubber backup roll 48 is pressed into contact with the laminating roll preferably at a pressure of about 300 pounds per lineal inch. The polyester carrier sheet on which the paint film is cast is stripped away from the paint film and passed to a take-up roll 49. A thin protective film such as polyvinyl acetate is unwound from a storage roll 50 and laminated to the clear coat side of the paint film by laminating rolls 51. The sheets travel around the drums 60, 62 and 64 at a slow speed during laminating to ensure that the resulting laminate 52 is heated to a temperature approaching the temperature of the laminating drum. This softens the backing sheet material somewhat as well as activating the adhesive layer to ensure a complete bond between the paint coat and the backing sheet. The polyester carrier sheet of the paint coated film has a heat resistance well above laminating temperature so the carrier resists elongation during the laminating step. Following the transfer-lamination or bonding step, the flexible paint coated laminate 52 is then passed around one or more chill rollers (not shown) for cooling the laminate to room temperature. Prior to passing around the chill rolls the film is laminated with the protective outer film 50 while the top coat is warm. The finished laminate 52 then passes onto a laminate rewind drum 54.

The coextrusion process of FIG. 2 simplifies the production process when compared with a process for producing a preformed backing sheet and laminating it to a paint film to which the size coat has been solvent cast. By coextruding the backing sheet and adhesive layer, the step of separately coating the size coat to the dry paint film by a reverse roll coater is eliminated.

Figure 4:
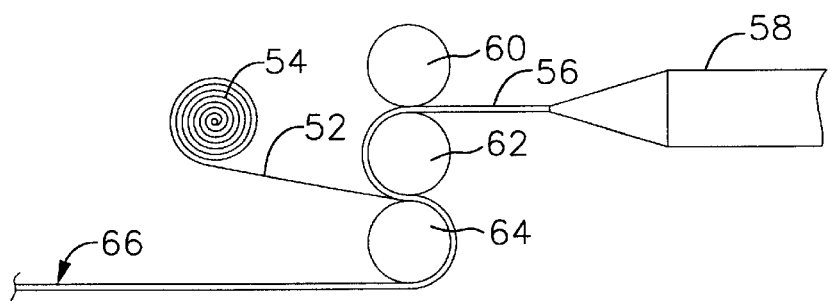
FIG. 4 is a schematic side elevational view showing a process for extrusion lamination to make thick sheets.

Referring to FIG. 4, the preformed paint film laminate 52 is next laminated to the top of a thick polymeric substrate sheet preferably when the substrate sheet is extruded. A thick substrate sheet 56 is initially extruded from the die of an extrude 58. The extruded sheet then passes through a three-roll calendaring stack comprising an upper roll 60, an intermediate roll 62 and a bottom roll 64. The extruded sheet first passes between the upper and intermediate rolls which are operated at temperatures for immediately cooling the sheet to stabilize it. The sheet is also polished on both sides by the rolls. The extruded sheet then wraps around the intermediate roll 62 and passes between the nip of the rolls 62 and 64. At the same time, the paint film laminate 52 is unwound from roll 54 and passes into the nip of the same rolls 62 and 64. This applies heat and pressure to fuse the backing sheet side of the laminate 52 to one side of the extruded thick sheet 56. This extrusion lamination step produces a composite thick sheet laminate 66 with the paint film laminate bonded as an integral unit to the extruded thick sheet substrate. Preferably, the bottom roll 64 of the stack is operated at a lower temperature than the other two rolls for providing further temperature reductions in the lamination step. The preferred approach is to pass the paint film laminate 52 through the nip on the side contacted by the bottom roll 64 of the stack so that its lower roll temperature is applied directly to the carrier sheet side of the paint film laminate when joining the laminate to the extruded sheet 56.

Figure 5:
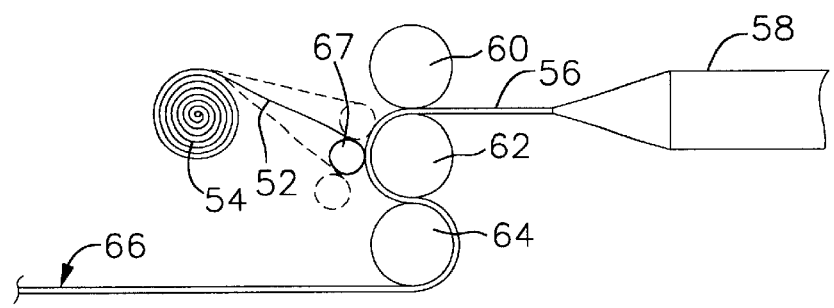
FIG. 5 is an alternative embodiment of the extrusion lamination process of FIG. 4.

FIG. 5 illustrates an alternative extrusion-lamination process similar to FIG. 4, but with a modification that accommodates lamination of paint film-backing sheet laminates to thinner extruded substrate sheets. In FIG. 5 the paint film-backing sheet laminate 52 is bonded to the extruded sheet at a higher point on the intermediate roll 62. The laminate 52 in this instance is applied at the nip of the intermediate roll 62 and a separate laminating roll 67. The purpose is to raise the level of the nip closer to the center of the roll 62 for thinner extruded substrates (say in the 40 mil range) and to gradually lower the nip to the point shown in FIG. 4 for thicker extruded substrate sheets (say in the 200 to 250 mil range). The adjustment of the nip location maintains desirable paint film temperatures so they are not adversely affected as residual heat in the substrate increases.

The thick substrate sheet is extruded at a thickness that coincides with the desired thickness of the finished part. According to the present invention, an objective is to avoid a subsequent injection molding step in forming the substrate component of the finished part. The extruded substrate sheet component provides the necessary rigidity or structural integrity of the finished part, and yet the substrate sheet must be sufficiently thermoformable to be shaped by thermoforming into the desired contour of the finished part. In one form of the invention, the extruded substrate sheet has a minimum thickness of at least about two to about three times the thickness of the backing sheet. In one embodiment, the backing sheet is about 10 to 12 mils thick and the extruded substrate sheet is about 48–50 mils thick. In another embodiment, the backing sheet is about 18 to 20 mils thick and the extruded substrate sheet is about 0.20 to 0.25 inch thick. Insofar as relative dimensions are concerned, the backing sheet preferably has a thickness in the range of about 10 to about 30 mils, and the extruded thick substrate sheet has a thickness in the range from about 40 mils to about 0.25 inch.

The substrate sheet 56 is preferably made from a material comprising essentially the same polymeric composition or at least a polymeric composition compatible with the polymeric material contained in the backing sheet, in the sense that the two materials may be compatibly fused together under heat as an integral structural unit. In one form of the invention, the thick substrate sheet material is extruded as illustrated in FIG. 4, and the substrate material is sufficient to fuse to the backing sheet using the heat of extrusion to heat bond the two sheets together as an integral unit by melt adhesion techniques.

The preferred materials from which the thick substrate sheet is made are ABS, for bonding to an ABS backing sheet, or TPO including polypropylene or polyethylene when bonding the thick sheet to similar compatible materials contained in the backing sheet. The paint film on the surface of the finished laminate 66 has a defect-free surface, maintaining the desired optical properties of an automotive quality paint finish. Any defects in the substrate material, such as filler particles or regrind material, are absorbed by the intervening backing sheet to provide the defect-free paint coat.

During extrusion-lamination the molten material extruded at the die opening of the extruder typically has a temperature of about 400° F. to 450° F., depending upon the polymeric extruded material. The temperature at which lamination takes place is substantially lower owing to the temperature reduction produced by the calendaring rolls next to the extruder die exit opening. In one embodiment, the upper roll 60 is operated at a temperature in the range of about 200° F. to about 216° F., the intermediate roll 62 is operated at a temperature in the range of about 175° F. to about 210° F., and the bottom roll 64 is operated at a temperature in the range of about 150° F. to about 205° F. This lowers lamination temperature at the nip of the intermediate and lower calendaring rolls to about 380° F. to about 420° F. At these temperature levels the paint film laminate can be successfully bonded to the extruded thick substrate sheet while the necessary heat levels do not adversely cause haze or fogging of the paint film. These roll temperatures are cited as examples only and can be adjusted for controlling heat bonding and absorbed heat levels at the paint film to ensure optical clarity of the finished film, depending upon the materials used. It should be noted that in the process of FIGS. 4 and 5, the protective sheet 50 which was applied in the processing step of FIG. 3 remains intact as a protective cover for the paint film during the extrusion-lamination process and the subsequent forming step. The protective sheet also is left in place after the forming step to protect the outer clear coat surface from abrasion.

Figure 6:
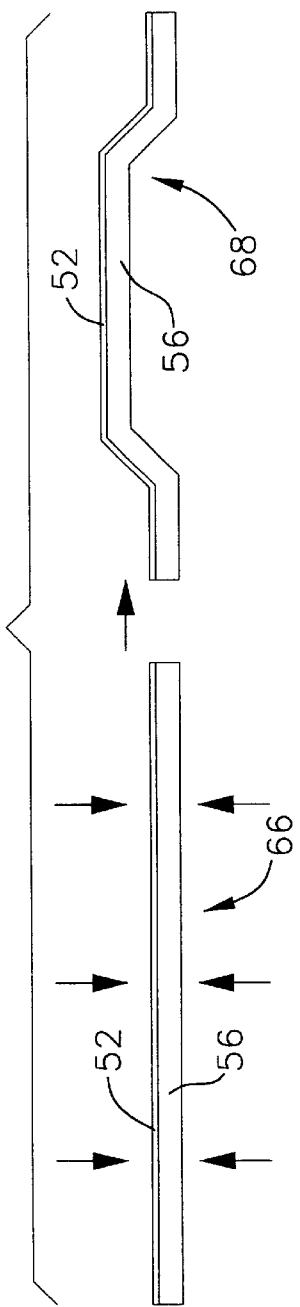
FIG. 6 is a schematic view illustrating thermoforming of the thick sheet laminate produced by the steps shown in FIG. 4.
Figure 7:
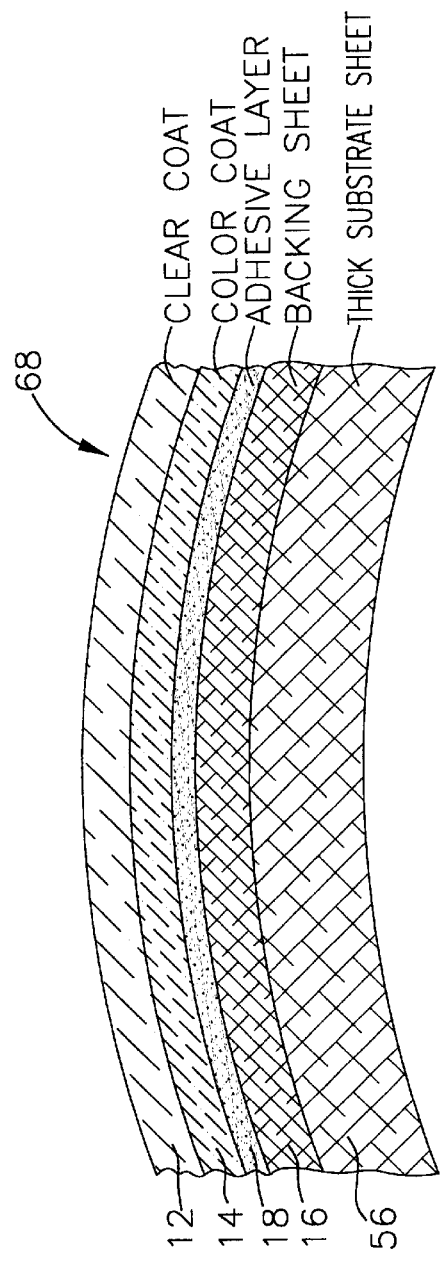
FIG. 7 is a schematic cross-sectional view showing the finished part following thermoforming to a three-dimensional contour.

Referring to FIG. 6, the thick sheet laminate 66 is thermoformed into a desired three dimensional shape of the finished part. The initially flat laminate can be formed into a highly contoured three dimensional shape for use as a finished exterior automotive car body panel or member. FIG.

7 schematically shows a three dimensionally shaped thick sheet laminate 68 which has been thermoformed to a finished three dimensional shape following thermoforming. In one embodiment, the thick sheet laminate 66 can be thermoformed and trimmed to produce a finished automotive part, such as a facia or a body side molding trim part, each of which are ready to be put on a vehicle. The process avoids a subsequent molding step for forming a molded substrate or structural component of the finished part. The thermoforming step can be carried out by various types of thermoforming equipment. During thermoforming, the thick sheet laminate is preheated to a thermoforming temperature in an oven, followed by vacuum forming the sheet into a desired three dimensional shape. The thermoforming temperature is in a range which allows softening and thermoplastic elongation of the paint film and its supporting sheet to form the finished part. The actual sheet temperature to which the paint film is subjected (not oven temperature) is at a level that prevents deglossing of the paint film during thermoforming. In one embodiment, sheet temperatures during thermoforming range from about 310° F. to about 360° F. at the paint film surface of the sheet. The core temperature of the thick substrate sheet also is raised to a temperature substantially within the same temperature range so that heat transmitted to the paint film surface from the substrate does not adversely affect optical properties of the paint film. When the thick sheet laminate is preheated in the thermoformer oven to raise its core temperature to a desired thermoforming temperature, it is desirable to apply proportionately more heat to the back side of the laminate than to the front side of the film. By applying approximately zero to 30% of the heat to the front side and approximately 70% to 100% of the heat to the back side, the back side of the laminate ends up about 20° F. to 30° F. hotter than the front side. This produces about 20% higher DOI and about 10% higher gloss than a more evenly distributed application of heat. The desired oven temperature of the thermoformer is about 450° F. to 650° F., and this temperature can vary depending upon the thickness of the substrate sheet, and the desired cycle times. For a 60 mil thick sheet for example, cycle time is about 1.5 to 2 minutes for heating the laminate to its forming temperature. Sheet temperatures in the 340° F. to 360° F. range produce the best combination of DOI and gloss, in one trial.

FIG. 8 illustrates a post-processing step in which fasteners or reinforcing members can be applied to the finished laminate 68 for use in converting the finished part into a structural panel. The illustrated process is an example of a twin sheet forming process in which an attachment mechanism 70 is embedded in a final laminated sheet 72. The process includes starting with the thick sheet laminate 68 at a storage roll 74 and a separate thick polymeric substrate sheet 76 on a storage roll 78. The two thick sheets pass around separate rolls 80 and are fed to a thermoformer as separated sheets. A preheater 82 located between the sheets preheats both sides of the sheets, along with main heaters 84. The reinforcement mechanism or fastener 70 is inserted into the void space prior to the forming station where forming tools 86 apply heat and pressure to the two sheets to bond them together as an integral structural unit 88 with the attachment device or reinforcement embedded in the final part. The two joined sheets also can be shaped to a contour in the former. This can produce structural parts where the twin substrate sheets (the laminate 68 and the sheet 76) can each have a thickness in the range of 200 to 250 mils, for example, and be bonded together to form the thick structural part 88.

As an alternative, the finished part 68 can have fastener or reinforcement parts attached to it by conventional welding, spin welding or sonic bonding techniques.

EXAMPLE 1

Weatherable thermoplastically formable paint films for use in this invention can be made from many suitable polymeric materials and formulations. One such paint system useful in practicing this invention comprises a base coat/clear coat paint system in which each paint film layer comprises an alloy of PVDF and acrylic resins. Such exterior automotive paint films are available from Avery Dennison Corporation under the trademark AVLOY®. A clear coat formulation useful in practicing this invention comprises about 60% PVDF and about 40% acrylic resin, by weight, based on the total resin solids contained in the dry paint film. A typical clear coat formulation, based on parts by weight, is as follows:

| Ingredients | Parts |
| --- | --- |
| PVDF (KYNAR 500 plus homopolymer - Elf Atochem) | 20.0 |
| Polyethyl methacrylate (ELVACITE 2042-ICI) | 12.0 |
| Dispersing agent (Solsperse 17000) | 0.06 |
| UV absorber (Tinuvin 900) | 0.64 |
| Cyclohexanone | 19.52 |
| Exxate ® 700 - Exxon Chemicals | 21.53 |
| Eutylactone (BLO) | 26.25 |

A color coat formulation useful in practicing this invention also comprises about 60% PVDF and about 40% acrylic resin, by weight of the total resin solids contained in the dry film. In this instance a portion of the acrylic resin solids content is provided by the acrylic resin vehicle for the pigment dispersion. A typical color coat formulation for a jet black automotive paint film is as follows:

| Ingredients | Parts |
| --- | --- |
| PVDF (KYNAR 500 plus - Elf Atochem) | 16.90 |
| Polyethyl methacrylate (ELVACITE 2042) | 10.14 |
| Dispersing agent (Solsperse 17000) | 0.05 |
| UV absorber (Tinuvin 900) | 0.54 |
| Black pigment dispersion | 14.72 |
| Blue pigment dispersion | 0.78 |
| BLO | 22.19 |
| Exxate ® 700 | 18.19 |
| Cyclohexanone | 16.49 |

The pigment dispersions contained in the color coat can vary, depending upon the choice of color. The following pigment dispersions are used in the preceding color coat formulation.

The black dispersion designated as 474-39350 pigment dispersion from Gibraltar Chemical comprises:

| Ingredients | Parts |
| --- | --- |
| Pigment - (FW 206 DeGussa) | 7.0 |
| Acrylic resin - (B735 - Zenica) | 29.7 |
| Exxate 600 - (Exxon Chemicals) | 31.65 |
| BLO | 31.65 |

The blue dispersion designated as 474-34550 pigment dispersion from Gibraltar comprises:

| Ingredients | Parts |
| --- | --- |
| Pigment (Palomar Blue - Bayer) | 9.10 |
| Acrylic resin - B735 | 22.30 |
| Exxate 600 | 34.3 |
| BLO | 34.3 |

Various other pigmented color coats can be used without departing from the scope of the invention. In addition to basic pigmented color coats and metallic automotive paints, the color coat also can include print patterns such as Silver Brush sold under the designation AVLOY® by Avery Dennison Corporation. This color coat consists of a base coat comprising a dispersion of metal flake sold under the designation METALURE® by Avery Dennison, together with suitable print coats between the base coat and clear coat, to provide the finished pattern.

The clear coat/color coat paint film may be cap sheet laminated either to a thick ABS substrate sheet or to a thick TPO substrate sheet. In the ABS embodiment, an acrylic adhesive layer approximately 0.8 to 1.5 mils in thickness is coextruded with an ABS backing sheet approximately eleven mils in thickness. The acrylic adhesive is made from acrylic resin materials such as AutoHaas DR 101 or Cyro HS116. The ABS backing sheet is extruded from a premium grade material having a low gel count, such as LSA from General Electric. In one embodiment the extruded thick substrate sheet was extruded at a thickness of about 49 mils and was made from a lower grade general purpose ABS composition having up to 30% regrind materials, such as LS 1000 from G.E. In a similar embodiment an 18 mil thick high grade ABS sheet was cap sheet laminated to a 40 mil thick extruded ABS blended with regrind materials.

In an embodiment comprising a TPO substrate, the adhesive layer is cast as a dual-layer size coat, first with an acrylic size coat for bonding to the color coat side of the paint film, and second, with a chlorinated polyolefin (CPO) size coat cast on the acrylic size coat, for bonding to a TPO backing sheet. The acrylic size coat can comprise ELVAC-ITE 2042 PEMA resin solvent cast from suitable solvents and dried to a film thickness of about 12 gm/m². The CPO size coat can comprise DuPont 826 or Hardlyn CP13 resins, solvent cast from suitable solvents and dried to a film thickness of about 12 gm/m². In one embodiment, the TPO backing sheet can be a preformed 20 mil thick premium grade TPO such as E 1501 or E 900 from Solvay or R370 from Royalite. The extruded thick TPO substrate sheet can have a thickness from about 0.20 to 0.25 inch and can be made from lower grade materials from the same suppliers.

EXAMPLE 2

The objective of this trial was to make a coextruded sheet comprising an acrylic resin adhesive layer and an ABS resin backing sheet. Both the acrylic resin and ABS resin starting materials require drying of excess moisture before extruding. This is accomplished by drying the resin in a desiccant dryer for at least 2 hours at 150° F. for the acrylic resin and 170° F. for the ABS. During extrusion additional resin is added to the dryers as resin is pumped to the extruder via vacuum lines. While running, the dryers are set at 200° F. to dry the resin constantly input to the dryer. The resin should have a final moisture content below 0.08% moisture content to prevent problems with extrusion. The desired moisture content level for extrusion is between about 0.02% to 0.04%.

The dried resin pellets of each material are fed into the hoppers on the top of each extruder via vacuum tubes. From the hoppers the pellets are gravity fed into the feed section of the extruder barrel. They are screen fed through the barrel and heated to a molten state. The resins in the two extruders are fed through their respective barrel sections to a single combining block and then into the die of the extruder. The molten sheet exits the die and runs through a 3-roll calendaring stack which polishes both sides of the sheet. As the sheet travels down the line it is cooled by passing over chilled steel rolls and finally is wound up into a roll. In one embodiment the final roll comprised about 0.8 to about 1.5 mil acrylic lacquer and a 28.5 mil ABS layer for a total sheet thickness of 30 mils. Final melt temperatures of the molten resin were as follows:

| Barrel zone | Die Zone |
| --- | --- |
| 1 - 430° F. | 1 - 480° F. |
| 2 - 410 | 2 - 470 |
| 3 - 420 | 3 - 430 |
| 4 - 409 | 4 - 450 |
| 5 - 404 | 5 - 460 |
| Adaptor | Flange |
| A1 - 400° F. | mixer  slide |
| A2 - 400 | 480° F.  450° F. |
| Co-extrusion block: | 400° F. |

Die temperature is 440° F. for all zones, and melt temperature is 408° F. Line speed is 39.8 ft/min. In the 3-roll calendaring stack the start temperatures of the top, middle and bottom rolls were 170° F., 150° F. and 145° F., respectively.

EXAMPLE 3

Extrusion cap sheet lamination trials were conducted according to principles of this invention. Suitable cap sheet lamination equipment is available from Spartech, Portage, Wis. In one trial a 20 mil thick dry paint film-backing sheet laminate was cap sheet laminated to a 0.22 inch thick extrusion of 100% re-pelletized E900 TPO. Avloy® dry paint transfer films available from Avery Dennison Corporation, such as AL310036 G3, AL310043 G3 and AL310056 G3, were laminated to the 20 mil thick backing sheet of TPO material and then cap sheet laminated to the 0.22 inch extruded TPO sheet, using the heat of extrusion to laminate the backing sheet side of the preformed paint film laminate to the thick extruded substrate. In this embodiment the upper, intermediate and lower roll temperatures at the extruder die exit were 210° F., 210° F. and 150° F., respectively. In another trial a 22 mil thick dry paint laminate was laminated to a 0.230 inch TPO sheet. The upper roller at the extruder die exit in this instance was at 216° F. The process produced a 0.25 inch thick composite laminate ready for thermoforming to a finished automotive body panel.

Thus, the thin thermoformable backing sheet can be made from a high quality polymeric material free of gels or other defects, and the backing sheet will mask any gels or other defects in the extruded thick sheet to prevent them from being transmitted to the paint film side of the finished part during thermoforming. As a result, a lower grade of polymeric materials can be used for the extruded thick substrate sheet. By using a lower grade substrate material as a major portion of the final construction, the process provides significant cost savings. By thermoforming the part out of a material thick enough to be directly put onto the car, the need for injection molding the substrate component, including costly injection molding equipment and special tooling, is avoided, further reducing production costs.

What is claimed is:

1. An exterior automotive quality body panel or member comprising a dry paint transfer film for providing a layer of color to the exterior of the finished panel or member;

a relatively thin semi-rigid polymeric backing sheet adhered to the dry paint transfer film;

a relatively thick supporting sheet of a thermoformable polymeric material which has been extruded and laminated to the backing sheet and heat bonded to the backing sheet to form an integral substrate sheet which is thermoformed to a three-dimensional shape with the dry paint transfer film bonded to its outer surface;

the backing sheet and extruded supporting sheet comprising compatible polymeric materials to promote the bond between them, the polymeric material of the backing sheet having a lower gel count than the thicker extruded supporting sheet material, the polymeric material of the extruded supporting sheet having a substantially higher filler content than the backing sheet material, the relatively thicker extruded supporting sheet component of the substrate having a thickness at least 40 mils;

the thermoformed three-dimensionally contoured body panel or member having an exterior outer surface of exterior automotive quality with a distinctness-of-image of at least about 60 in the absence of appreciable haze caused by thermoforming to its finished shape.

2. The product according to claim 1 in which the dry paint transfer film comprises a base coat/clear coat film having said distinctness-of-image greater than about 60.

3. The product according to claim 2 in which the backing sheet has a thickness in the range of about 10 mils to about 30 mils.

4. The product according to claim 2 in which the supporting sheet is bonded to the backing sheet by the heat of extrusion of the supporting sheet and the laminating pressure in joining the two sheets together as a composite integral sheet.

5. The product according to claim 1 in which the extruded sheet has thickness at least three times the thickness of the backing sheet.

6. The product according to claim 1 in which the backing sheet and an adhesive layer are coextruded for bonding to the dry paint transfer film, the dry paint transfer film bonded to the adhesive side of the coextrusion.

7. The product according to claim 2 in which the clear coat side of the dry paint transfer film comprises an alloy of an acrylic resin and a fluoropolymer resin.

8. The product according to claim 7 in which the film comprises from about 50 percent to about 70 percent PVDF and about 30 percent to about 50 percent acrylic resin, by weight.

9. An exterior automotive quality body panel or member comprising:

a dry paint transfer film for providing a layer of color to the exterior of the finished panel or member;

a relatively thin semi-rigid polymeric backing sheet adhered to the dry paint transfer film;

a relatively thick supporting sheet of a thermoformable polymeric material which has been extruded and laminated to the backing sheet and heat bonded to the backing sheet to form an integral substrate sheet which is thermoformed to a three-dimensional shape with the dry paint transfer film bonded to its outer surface;

the polymeric material of the backing sheet having a lower gel count than the thicker extruded supporting sheet material, the polymeric material of the extruded supporting sheet having a substantially higher filler content than the backing sheet material;

the thermoformed three-dimensionally contoured body panel or member having an exterior outer surface of exterior automotive quality in the absence of appreciable haze caused by thermoforming to its finished shape, in which the dry paint transfer film comprises a base coat/clear coat film having a distinctness-of-image greater than about 60, in which the backing sheet has a thickness in the range of about 10 mils to about 30 mils and the relatively thicker supporting sheet has a thickness of at least about 40 mils, in which the polymeric material of the backing sheet has a lower gel count than the thicker extruded sheet material, and in which the clear coat side of the dry paint transfer film comprises a blend of an acrylic resin and a fluoropolymer resin.

\* \* \* \* \*